Patented May 28, 1940

2,202,145

UNITED STATES PATENT OFFICE 2,202,145

OIL SYNERGIST FOR INSECTICIDES

Craig Eagleson, Fruitdale, Tex., dedicated to the free use of the People in the territory of the United States No Drawing. Application October 3, 1938, Serial No. 233,010

3 Claims. (Cl. 167—24)

(Granted under the act of March 3, 1883, as amended April 30, 1928; 370 O. G. 757)

This application is made under the act of March 3, 1833, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to substances used to improve and increase the toxic action of insecticides. My invention comprises the addition of a quantity of oil of plant origin to an insecticidal mixture for the purpose of improving the said insecticide and rendering it more effective as an active agent when used to combat insects by killing or repelling them. For the purpose of brevity and to avoid repetition, substances mentioned hereinafter which exhibit this action when added to an insecticide will be termed synergists.

I have discovered that sesame oil acts as a synergist when combined with such insect toxins as pyrethrins, rotenone, and the like. The synergistic effect of such oils both reduces the necessary concentration of insect toxin required to produce 100-per cent mortality of the insects, and prolongs the paralysis or torpor of such insects as are not hit with sufficient insecticide actually to produce death. In household and livestock sprays as now generally manufactured and applied, it is not practical to incorporate sufficient toxin to insure the death of all insects overcome or paralyzed by the insecticide. This fact constitutes one of the major shortcomings of this method for the control of many household and livestock pests. By my invention, namely, the addition of a quantity of synergistic oil, namely, sesame oil, the efficacy of the insecticide can be markedly increased. This oil is relatively inexpensive, thus permitting a substantial saving in the cost of insect control in cases where the aforementioned insect toxins are appropriate.

I have discovered that the addition of a quantity of sesame oil increases the initial torpor, prolongs the duration of torpor, and results in a higher mortality of the insects. The effect of adding sesame oil in various concentrations to a sublethal concentration of pyrethrin insecticide (an application of which would not kill more than 5 per cent of a sample of Musca domestica) is shown in the following table. The fact that this increment in toxicity is due to a synergistic relationship and not merely to the addition of another toxin is shown by the failure of sesame oil alone to kill flies.

| Exp. No. | Strength of insecticide | | Mean torpor* | |
|---|---|---|---|---|
| | Molar concentration of pyrethrins | Percentage by volume of sesame oil | Synergized insecticide | Nonsynergized insecticide |
| 845 | 0.0 | 20.0 | -------- | 0 |
| 844 | 0.0075 | 20.0 | 97 | 50 |
| 845 | 0.001 | 10.0 | 92 | 50 |
| 847 | 0.001 | 5.0 | 95 | 50 |
| 848 | 0.001 | 2.5 | 88 | 50 |
| 849 | 0.001 | 0.5 | 74 | 50 |

*Values adjusted corresponding to a value of 50 per cent mean torpor for the control. Control used was 0.001 molar pyrethrins in refined kerosene.

By the use of my invention the threshold of lethal concentration of such insecticides containing as toxic agents pyrethrins, rotenone, etc., is considerably lowered and the recovery from sublethal doses retarded. I have found that the insecticidal combinations of my invention require a substantially smaller amount of toxin to produce the same degree of toxicity as an insecticide prepared according to the prior art without the addition of a synergist.

The invention of using sesame oil as a synergist may be varied in a number of ways. The oil may be added to a previously compounded insecticide of mineral oil base, or it may be combined with a toxic plant or animal extractive or synthetic material and the mixture suitably diluted with a mineral oil. The synergistic oil may be used as the solvent or carrier for an active insect toxin or combination of toxic materials and combined with water and an emulsifier to form an emulsion.

The synergistic oil may be combined with materials in a dry state toxic to insects, such as pyrethrin, rotenone, or nicotine-bearing powders, or dry inorganic insecticides such as fluosilicates, arsenicals, sulfur, and the like, an appreciable quantity of the synergistic oil being adsorbed or merely adhering to the particles without reducing the dry insecticide to a non-pulverous state. The synergistic oil and insect toxin may be combined in a manner to form a paste for local application to the site of insect infestations or a general application to eradicate and/or prevent insect infestation.

The synergistic oil may be added to the toxic material by grinding the source material of the said synergistic oil with the plant parts from which the insect toxin is obtained and extracting both the toxin and synergist simultaneously, or by adding the synergistic oil to the natural plant parts bearing the insecticidal principles before grinding or otherwise pulverizing the same.

In the following claims the term "synergistic oil" refers to sesame oil of plant origin or produced by practice of the art of chemistry. As herein employed the word "synergism" refers to a state of action of two materials in which the effect of the combination is greater than the arithmetic sum of the effects of each of the materials used separately and alone.

It is distinctly implied and intended that by the words "materials toxic to insects" and "insecticidal" and "insecticidal materials" and words of similar import, are meant substances and materials not only toxic to insects but also toxic to certain other arthropods, annelids, and cephalapods which are considered to be pests.

Having thus described my invention, what I claim for Letters Patent is:

I claim:

1. An insecticide, comprising pyrethrins and containing sesame oil added as a synergist.

2. An insecticide, comprising rotenone and containing sesame oil added as a synergist.

3. An insecticide containing as its essential active ingredient a material selected from the group of plant extractives consisting of pyrethrins and rotenone, with sesame oil added.

CRAIG EAGLESON.